United States Patent
Rautschek et al.

(10) Patent No.: US 10,561,995 B2
(45) Date of Patent: Feb. 18, 2020

(54) PROCESS FOR CONTINUOUS PRODUCTION OF STABLE SILICONE EMULSIONS

(71) Applicant: Wacker Chemie AG, Munich (DE)

(72) Inventors: Holger Rautschek, Nuenchritz (DE); Sebastian Kroener, Burghausen (DE); Robert Schroeck, Altoetting (DE); Christian Spoerk, Altoetting (DE)

(73) Assignee: WACKER CHEMIE AG, Munich (DE)

( * ) Notice: Subject to any disclaimer, the term of this patent is extended or adjusted under 35 U.S.C. 154(b) by 114 days.

(21) Appl. No.: 15/742,423

(22) PCT Filed: Sep. 9, 2016

(86) PCT No.: PCT/EP2016/071380
§ 371 (c)(1),
(2) Date: Jan. 5, 2018

(87) PCT Pub. No.: WO2017/046017
PCT Pub. Date: Mar. 23, 2017

(65) Prior Publication Data
US 2018/0193808 A1  Jul. 12, 2018

(30) Foreign Application Priority Data

Sep. 14, 2015 (DE) .................. 10 2015 217 551

(51) Int. Cl.
| | |
|---|---|
| *C08L 83/00* | (2006.01) |
| *B01F 3/08* | (2006.01) |
| *B01F 7/04* | (2006.01) |
| *C08J 3/03* | (2006.01) |
| *C08L 83/04* | (2006.01) |
| *B01F 15/02* | (2006.01) |

(52) U.S. Cl.
CPC .......... *B01F 3/0807* (2013.01); *B01F 3/0853* (2013.01); *B01F 7/048* (2013.01); *C08J 3/03* (2013.01); *C08L 83/04* (2013.01); *B01F 2015/0221* (2013.01); *C08J 2383/04* (2013.01)

(58) Field of Classification Search
CPC . C08J 3/03; C08L 83/04; B01F 3/0807; B01F 3/0853
USPC ....................................................... 523/336
See application file for complete search history.

(56) References Cited

U.S. PATENT DOCUMENTS

| | | | |
|---|---|---|---|
| 5,561,209 A | 10/1996 | Pieschnick et al. | |
| 5,563,189 A | 10/1996 | Hosokawa et al. | |
| 5,806,975 A | 9/1998 | Hosokawa et al. | |
| 7,619,010 B2* | 11/2009 | Schneider | C08J 3/03 516/53 |
| 8,530,401 B2 | 9/2013 | Becker et al. | |
| 8,575,266 B2* | 11/2013 | Brehm | C08G 77/06 524/837 |
| 9,156,954 B2* | 10/2015 | Cauvin | A61K 8/062 |
| 2007/0203263 A1* | 8/2007 | Schroeck | C08J 3/03 523/322 |
| 2008/0064813 A1* | 3/2008 | Schneider | C08G 77/06 524/837 |
| 2013/0201785 A1 | 8/2013 | Dahms et al. | |
| 2013/0309283 A1 | 11/2013 | Rautschek et al. | |

FOREIGN PATENT DOCUMENTS

| | | |
|---|---|---|
| DE | 2357212 A1 | 5/1975 |
| DE | 133197 | 12/1978 |
| DE | 3914912 C2 | 6/1993 |
| DE | 102010028774 A1 | 11/2011 |
| EP | 1338330 A2 | 8/2003 |
| EP | 1607428 A1 | 12/2005 |
| EP | 1964604 A2 | 9/2008 |
| GB | 2106407 A1 | 4/1983 |
| KR | 2013-0114207 A | 10/2013 |
| WO | 0242360 A2 | 5/2002 |
| WO | 03092639 A1 | 11/2003 |

OTHER PUBLICATIONS

Köhler, K.; Schuchmann, HIP. (Hrsg.), Emulgiertechnik, Behr's Verlag, Hamburg, 3. Auflage 2012, Kapitel IX.2, "Aufbau und Funktionsweise typischer Rotor-Stator und Rotor-Rotor-Emulgiermaschinen", p. 188-192.
Dispersion Letters Technical, T4 (2013) p. 1-4.
Journal of Colloid and Interface Science, 298 (2006), p. 441-450.
W. Noll-Chemistry and Technology of Silicone, Verlag Chemie, Weinheim, p. 428-431, 1968.

* cited by examiner

*Primary Examiner* — Hannah J Pak
(74) *Attorney, Agent, or Firm* — Brooks Kushman P.C.

(57) ABSTRACT

Organopolysiloxane emulsions which are stable and of large particle size are produced in controllable fashion using a cylindrical mixer having multiple inlets and axially displaced rotor stator units.

21 Claims, 1 Drawing Sheet

PROCESS FOR CONTINUOUS PRODUCTION OF STABLE SILICONE EMULSIONS

CROSS REFERENCE TO RELATED APPLICATIONS

This application is the U.S. National Phase of PCT Appln. No. PCT/EP2016/071380 filed Sep. 9, 2016, which claims priority to German Application No. 10 2015 217 551.0 filed Sep. 14, 2015, the disclosures of which are incorporated in their entirety by reference herein.

BACKGROUND OF THE INVENTION

1. Field of the Invention

The invention relates to a process for continuous production of aqueous silicone emulsions, especially emulsions containing high viscosity polyorganosiloxanes.

2. Description of the Related Art

Silicones have a variety of uses. To facilitate application and metering in the case of viscous products in particular, there are many applications where it is desirable that the organosilicon compounds be in dilute form. The use of organic solvents, such as benzene or hydrochlorocarbons, for this purpose, while possible, is disadvantageous from both an ecological and an occupational hygiene point of view. Use therefore usually takes place in the form of aqueous emulsions or dispersions, typically as oil-in-water emulsions (O/W emulsions), which are thinnable with water. Oil is here to be understood as referring to the water-immiscible organosilicon compounds, optionally dissolved in organic solvents.

Emulsions containing polysiloxanes and other organosilicon compounds and their methods of making are known (W. Noll, Chemistry and Technology of Silicones, Verlag Chemie Weinheim, pp. 428-431, 1968).

Silicone emulsions are obtainable batchwise or continuously. The important factor is that the emulsification process should create stable emulsions and allow the particle size to be matched to the requirements of the intended application. There are, for instance, specific applications in cosmetics where large particle sizes are preferred (WO 03/092639 A1).

According to U.S. Pat. No. 7,619,010 B2, batch processes are often associated with some backmixing of the emulsion or the high viscosity intermediate due to a recirculation procedure at the homogenization stage. This lengthens the batch cycle and ultimately leads to a suboptimal outcome of mixing.

Alternatively, if high viscosity intermediates are avoided, high pressure homogenizers can be used, in which case the final homogenization is carried out alternatingly between two tanks in order to avoid the backmixing which occurs in a recirculation procedure (DD 133197). This does provide a more uniform quality of product, but this process is limited to low viscosity silicones and not very productive.

A continuous process is more productive and does not give rise to any backmixing.

U.S. Pat. No. 5,806,975 A describes an apparatus and a method for emulsifying high viscosity silicones in an extruder type appliance. Extruders are burdensome and by nature require a lot of floor space. For example, the length of the extruder used in this patent is equal to 10 times its diameter.

U.S. Pat. No. 5,563,189 A claims the continuous 2 stage production of an emulsion wherein the first stage comprises preparing a high solids emulsion which is then, in a $2^{nd}$ shearing appliance, diluted with additional water to the final concentration desired. The mixing mechanisms used, which have rotor and stator arranged on the same axial position and have the product flowing radially through the rotor, have very small dimensions for the gap and lead to very high rates of shear. This is not advantageous for all applications, particularly with shear sensitive products or when the intention is to produce larger particles.

WO 2002/42360 A2 describes the continuous production of emulsions by means of one or more shearing mixers wherein the siloxane, the emulsifier and the water is fed to the mixer through one line and the pressure at the inlet to the mixer is maintained within 20% in order to control the particle size, to form a stiff phase. High shear mixers are stated to include colloid mills of the Bematek brand for example, i.e., mixers having rotor and stator at the same axial position and product flowing radially therethrough via a narrow gap. This process is therefore likewise directed to obtaining small particle sizes and not very suitable for production of products having larger particle sizes or for emulsification of shear sensitive products.

US 2007/0203263 A1 describes a process wherein a plurality of high shear mixers are combined in series. The mixers used are preferably rotor-stator mixers.

According to the prior art, rotor-stator mixers, especially colloid mills and toothed cog dispersing machines (see Köhler, K.; Schuchmann, H. P. (eds.), Emulgiertechnik, Behr's Verlag, Hamburg, 3rd edition 2012, chapter IX.2 "Construction and Functioning of Typical Rotor-Stator and Rotor-Rotor-Emulsifying Machines", pp. 188-192), i.e., mixers having rotor and stator at the same axial position and product flowing radially therethrough via a narrow gap, are suitable for the continuous manner of emulsion production.

The high shear mixers used in US 2007/0203263 A1 each have their own delivery performance which depends on rotational speed (in the manner of a centrifugal pump), meaning that the shearing energy input simultaneously affects the throughput and the pressure conditions and is not fully decoupleable from these parameters.

Emulsification is controlled via the pressures and temperatures measured downstream of these mixers. In addition to the production of emulsions with precisely adjustable higher particle sizes or with shear sensitive products being problematic, the combination of two or more mixers having mutually independent drives in series, the alignment of the throughputs and the control according to many parameters is very cumbersome and hence liable to go wrong. The particle sizes obtained in this process are generally smaller than 1 µm.

EP 1 607 428 B1 proposes inter alia performing a continuous emulsification using a combination of static mixers connected in series. This leads to high pressure drops being incurred in the static mixers, requiring compensation at high cost in terms of energy requirements.

The problem addressed by the present invention is therefore that of providing a continuous process for the production of silicone emulsions which is useful for a wide spectrum of products, permits accurate control of the particle size, is notable for pressure drops being low and hence is particularly energy efficient.

The problem is solved by the invention.

SUMMARY OF THE INVENTION

The invention provides a continuous process for production of emulsions which comprises polyorganosiloxanes (A), emulsifiers (B), water (C), and optionally further components (D) typically present in silicone emulsions, being continuously fed into a mixer and mixed therein to form an emulsion which is withdrawn from the mixer in a continuous manner, characterized in that the mixer is a cylindrical mixer which has two or more rotor-stator mixing elements for axial flow therethrough, which has the rotor and stator elements each arranged with an axial offset and which contains at least one feedpoint upstream of the mixing elements of the mixer and at least one further feedpoint along the mixer, between the mixing elements, wherein the polyorganosiloxanes (A) are supplied via a feedpoint at the entry to the mixer, optionally in the form of a premix with a portion of a component selected from emulsifiers (B), water (C), further components (D) and mixtures thereof, and emulsifiers (B) and water (C) and optionally portions of polyorganosiloxanes (A) and optionally further components (D) are each supplied independently from each other, separately or as a premix at a feedpoint upstream of the mixing elements and/or at one or more feedpoints between the mixing elements along the mixer, wherein the admixture of the total amounts of components (A) to (D) is in each case effected independently of one another via one feedpoint or across two or more feedpoints.

DETAILED DESCRIPTION OF THE PREFERRED EMBODIMENTS

In addition to the feedpoint for the polyorganosiloxane (A), the mixer preferably has two further feedpoints for components (A), (B), (C) and optionally (D). Of these, components (B), (C) and optionally (D) may also be added in the form of a premix. Mixing some of components (B), (C) and optionally (D) with the polyorganosiloxane (A) upstream of the mixer is possible. The number of additional feedpoints for the subsequent addition of components (A), (B), (C) and optionally (D) is not limited. For cost reasons and in the interests of simple and hence efficient process control, one feedpoint upstream of the mixing elements of the mixer is preferably accompanied by 1 to 10, in particular 1 to 5, additional feedpoints along the mixer.

Preferably, in the process of the present invention, the polyorganosiloxanes (A) are fed at the point of entry to the mixer and the admixture of the total amount of emulsifiers (B) and water (C) is effected in each case independently of each other, separately or as a premix, at a feedpoint upstream the mixing elements of the mixer or divided across the feedpoints upstream and between the mixing elements of the mixer.

More preferably, in the process of the present invention, the polyorganosiloxanes (A) are supplied at the point of entry to the mixer, emulsifiers (B) are admixed at a feedpoint upstream the mixing elements and the admixture of the total amount of water is effected at a feedpoint upstream the mixing elements or divided across the feedpoints upstream and between the mixing elements.

Yet more preferably, emulsifiers (B) and water (C) are admixed as a premix at a feedpoint upstream the mixing elements. Especially in that case further water (C) is admixed at one or more feedpoints between the mixing elements.

Figure 1:
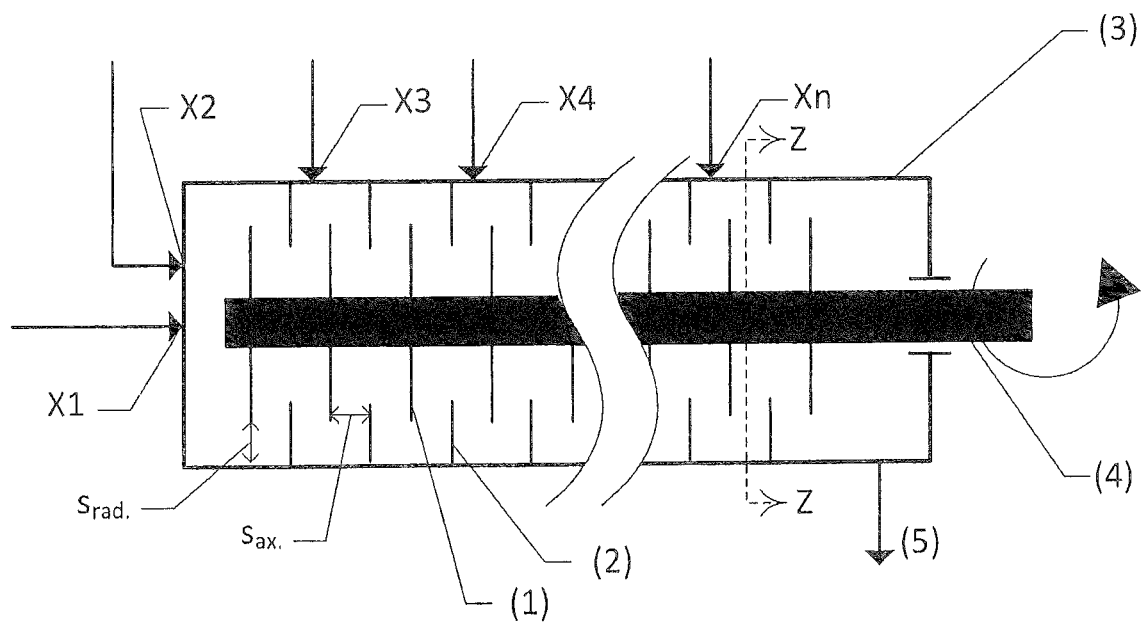
FIG. 1 illustrates one embodiment of a cylindrical mixer used in the process of the invention.

FIG. 1 illustrates the process by way of example. Components A, B, C and optionally D are supplied to the mixer via feedpoints X1 to Xn, independently of one another, separately or as a premix either as the total amount at one feedpoint or divided across two or more feedpoints. These may be placed upstream and/or between the mixing elements. The mixer, consisting of a cylindrical housing (3) with fixed stator elements (2) and a rotating shaft (4) with attached rotor elements (1) and has the product main stream flowing axially therethrough. The shearing and stretching fields which arise in the process lead to the dispersal of the polyorganosiloxane (A) in the continuous phase. The product is continuously withdrawn via the outlet (5). Rotor and stator elements are each offset axially by the gap size ($s_{ax.}$). The radial gap size ($s_{rad.}$) is defined as the distance between the rotor tip and the cylindrical housing of the mixer. The gap sizes may vary from mixing element to mixing element. Various geometries for the rotors and stators are possible, particularly the use of disks, triangular cams, quadrangular cams, cylindrical pins and needles and also combinations thereof being obvious.

Figure 2:
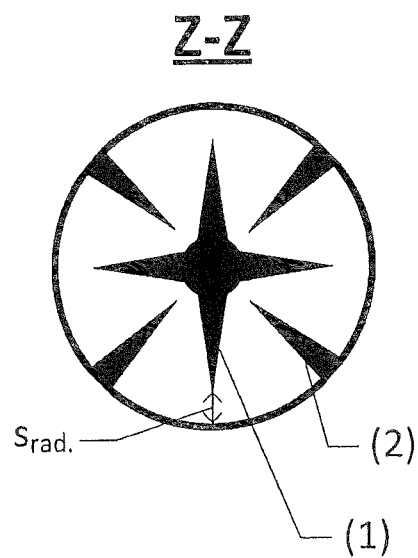
FIG. 2 illustrates one embodiment of a cylindrical mixer used in the process of the invention, in cross-section across Z-Z of FIG. 1.

The sectional depiction as per FIG. 2 merely represents an exemplary rotor-stator geometry.

The cylindrical form of mixer construction enables subsequent addition at various axial positions and thus inaugurates a significant additional variable for controlling the emulsification. This is technically not possible with the use of typical toothed cog dispersers or high pressure homogenizers.

The number of rotor-stator mixing element pairs in the mixer is preferably 3 to 60 and more preferably 5 to 40.

The axial gap between rotor and stator ($s_{ax.}$) of the mixing elements is preferably 0.1 to 15 mm more preferably 1 to 5 mm. Different gap sizes between the elements are possible.

The radial gap between the rotor of the mixing elements and the housing of the mixer ($s_{rad.}$) is preferably 0.1 to 10 mm, more preferably 0.5 to 5 mm. Different gap sizes between the elements are possible.

The geometry of the individual rotor-stator mixing elements and the gap sizes may be identical but also different, so different mixing intensities are realizable within the mixer despite the identical number of revs. In principle, all or individual mixing elements may also consist of the rotor only. This makes the process very flexible in its adaptability to requirements.

The proportion of the cross-sectional area allowing unhindered flow therethrough is preferably at least 30%, more preferably at least 50%, for the rotors, and at least 40%, preferably at least 60%, for the stators.

The mixers used in the process of the present invention have but minimal, if any, delivery capacity of their own, so the rotational speed of the rotor elements, that is to say the shearing energy input, is controllable irrespective of the throughput and of the pressure conditions, allowing a particularly flexible form of steering the emulsifying processes in the direction of the product properties desired.

The number of rotor-stator mixing elements attached after every feedpoint is preferably 2 to 10, especially 2 to 5, before the next feedpoint or the point of exit from the mixer. Dividing a laterally added feedstream between two or more injection points distributed on the circumference is possible. The separate subsequent addition of the components through injection points offset on the circumference at a similar axial position is also possible.

The additional feedpoints may be installed on the mixer tangentially or radially.

The components are fed via pumps which also overcome the pressure drop in the mixer. The pumps are preferably controlled via their rotational speed in order to ensure defined mass flows for the components.

The preferably high viscosity polyorganosiloxane (A) is preferably pumped using displacement pumps, especially gear pumps. Components (B) and (C) and optionally (D) or else previously prepared mixtures of these components are preferably metered via progressive cavity pumps, which ensure a consistent throughput where the volume flow is but minimally affected by the viscosity of the pumped medium.

The pressure drop in the process of the present invention is preferably less than 10 bar, more preferably less than 5 bar and yet more preferably less than 2 bar.

The length to diameter ratio of the cylindrical mixer is preferably at most 10, more preferably at most 6 and preferably at least 1, more preferably at least 2.

The rotational speed of the rotors in the mixer is preferably 10 to 5000 revolutions/min and more preferably 50 to 3000 revolutions/min.

The circumferential speed of the outside surface of the rotors is preferably 0.1 to 30 m/s and more preferably 0.5 to 15 m/s.

The residence time of component A in the mixer is preferably 0.25 min to 20 min and more preferably 0.5 min to 5 min.

The specific energy input in the mixing process is preferably 1 to 500 kJ/kg and more preferably 5 to 200 kJ/kg.

The space-time yield of the mixing process according to the present invention is preferably at least 3 kg/l*h and more preferably at least 12 kg/l*h.

In principle, two or more mixers may also be combined in series.

Polyorganosiloxane (A) may be used in the form of one polyorganosiloxane or of a mixture of two or more polyorganosiloxanes.

The process of the present invention may utilize any polyorganosiloxanes as polyorganosiloxane (A) and also their solutions or dispersions. Examples are linear polyorganosiloxanes and silicone resins. Silicone resins are products that do not just contain mono- and difunctional siloxane units but also display tri- and tetrafunctional siloxane units.

The polyorganosiloxane (A) and the mixtures of polyorganosiloxanes (A) used in the process of the present invention, are preferably liquid at 25° C. and preferably have viscosities of 10 to 50,000,000 mPa·s and more preferably 10,000 to 1,000,000 mPa·s as measured according to DIN ISO 53019.

Polyorganosiloxane (A) contains units of the general formula

where
$R^2$ in each occurrence represents an optionally substituted monovalent hydrocarbyl moiety of 1 to 30 carbon atoms or hydrogen atom and may be identical or different,
$R^1$ in each occurrence represents a hydrogen atom or an optionally substituted monovalent hydrocarbyl moiety and may be identical or different,
a is 0, 1, 2 or 3, and
b is 0, 1, 2 or 3,
with the proviso that the a+b sum is not more than 3.

The polyorganosiloxanes (A) used in the process of the present invention are preferably those containing 5 to 10 000 units of formula (I) and more preferably those of formula (I) units having an average value of 1.90 to 2.3 for a and of 0 to 0.2 for b.

Examples of hydrocarbyl moieties $R^2$ are alkyl moieties such as methyl, ethyl, n-propyl, isopropyl, 1-n-butyl, 2-n-butyl, isobutyl, tert-butyl, n-pentyl, isopentyl, neopentyl, and tert-pentyl; hexyl moieties such as n-hexyl; heptyl moieties such as n-heptyl; octyl moieties such as n-octyl and isooctyl moieties such as 2,2,4-trimethylpentyl; nonyl moieties such as n-nonyl; decyl moieties such as n-decyl; dodecyl moieties such as n-dodecyl; octadecyl moieties such as n-octadecyl; cycloalkyl moieties such as cyclopentyl, cyclohexyl, cycloheptyl and methylcyclohexyl; alkenyl moieties such as vinyl, 1-propenyl and 2-propenyl; aryl moieties such as phenyl, naphthyl, anthryl and phenanthryl; alkaryl moieties such as o-tolyl, m-tolyl and p-tolyl; xylyl and ethylphenyl; and aralkyl moieties such as benzyl, α-phenylethyl and β-phenylethyl.

Examples of substituted $R^2$ moieties are hydrocarbyl moieties substituted with halogen, cyano, glycidoxy, polyalkylene glycol or amino groups, e.g., trifluoropropyl, cyanoethyl, glycidoxypropyl, polyalkylene glycol propyl and amino-bearing hydrocarbyl moieties.

Examples of amino-substituted moieties $R^2$ are:
$H_2N(CH_2)_2N(CH_2)_3—$
$H_2N(CH_2)_2—$
$H_3CNH(CH_2)_3—$
$H_2N(CH_2)_4—$
$H_2N(CH_2)_5—$
$H(NHCH_2CH_2)_3—$
$C_4H_9NH(CH_2)_2NH(CH_2)_2—$ and
cyclo-$C_6H_{11}NH(CH_2)_3—$,
of which
$H_2N(CH_2)_3—$ and
$H_2N(CH_2)_2NH(CH_2)_3—$ are particularly preferable.

It is preferable for not more than 1 $R^2$ moiety in the units of formula (I) to represent a hydrogen atom.

Moiety $R^2$ represents with preference hydrocarbyl moieties having 1 to 18 carbon atoms and with particular preference methyl or phenyl, while especially more than 80 mol % of the $R^2$ moieties in siloxane (A) represent methyl and less than 20 mol % represent aminopropyl or aminoethylaminopropyl.

Examples of $R^1$ moieties include the examples recited for $R^2$ moieties. Moiety $R^1$ preferably represents hydrogen or hydrocarbyl moieties having 1 to 4 carbon atoms, more preferably hydrogen.

The a+b sum in formula (I) preferably has a value of, on average, from 1.5 to 2.4, more preferably on average from 1.9 to 2.3 and yet more preferably on average from 1.95 to 2.05.

Examples of the (A) polyorganosiloxanes used in the process of the present invention include the aminopropyldimethylsiloxy-, aminoethylaminopropyldimethylsiloxy-, vinyldimethylsiloxy-, trimethylsiloxy-, dimethylalkoxysiloxy or dimethylhydroxy-terminated polydiorganosiloxanes, especially polydimethylsiloxanes containing aminopropyl, aminoethylaminopropyl or carboxyalkyl side groups.

Preference for use as polyorganosiloxanes (A) is given to those of the formula

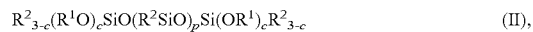

where $R^1$ and $R^2$ are each as defined above,
c is 0, 1 or 2, preferably 0 or 1, and
p is 1 to 100,000, preferably 5 to 10,000.

Examples of the (A) polyorganosiloxanes used in the process of the present invention are:

(CH$_3$)$_3$Si—O—[Si(CH$_3$)$_2$—O—]$_n$—Si(CH$_3$)$_3$
HO(CH$_3$)$_2$Si—O—[Si(CH$_3$)$_2$—O—]$_n$—Si(CH$_3$)$_2$OH
(CH$_3$)$_3$Si—O—[Si(CH$_3$)$_2$—O—]$_n$—[Si(CH$_3$) R—O—]$_m$—Si(CH$_3$)$_3$
HO(CH$_3$)$_2$Si—O—[Si(CH$_3$)$_2$—O—]$_n$—[Si(CH$_3$) R—O—]$_m$—Si(CH$_3$)$_2$OH
CH$_3$O(CH$_3$)$_2$Si—O—[Si(CH$_3$)$_2$—O—]$_n$—[Si(CH$_3$) R—O—]$_m$—Si(CH$_3$)$_2$OCH$_3$
C$_2$H$_5$O(CH$_3$)$_2$Si—O—[Si(CH$_3$)$_2$—O—]$_n$—[Si(CH$_3$) R—O—]$_m$—Si(CH$_3$)$_2$OC$_2$H$_5$,
wherein n may for example assume a value of 50-5000, m may assume a value of 1 to 100 and R is for example a moiety of the formula —C$_3$H$_6$NH$_2$, —C$_3$H$_6$NH—C$_2$H$_4$NH$_2$ or —C$_{10}$H$_{20}$COOH.

When component (A) is a reactive polyorganosiloxane, for example with vinyl or OH end groups, a chain-extending reaction, a polycondensation reaction or, in the presence of suitable reaction partners, a crosslinking reaction, for example, may take place in the emulsion. Reactions of this type are known to one skilled in the art and have the effect that the emulsions obtained according to the present invention contain polyorganosiloxanes having viscosities greater than 1,000,000 mPas (25° C.) or crosslinked elastomers of the polyorganosiloxane type.

The (A) polyorganosiloxanes used in the process of the present invention are prepared by known processes. It is preferable for the polyorganosiloxanes (A) to be produced in a continuous manner and for the process of the present invention to be carried out directly thereafter. That is, the importation of polyorganosiloxanes (A) into the axial flow-through mixer is preferably effected directly out of the point of exit from a thin film evaporator used to devolatilize the polymers or for polymer production (as described in U.S. Pat. No. 5,561,209 A for example) or directly out of the point of exit from an extruder or kneader used for polymer production (as described in DE 3914912 C2 for example).

Emulsifiers (B) are preferably used in amounts of 1 to 60 parts by weight and more preferably 5 to 30 parts by weight, based on 100 parts by weight of component (A).

One type of emulsifier (B) may be used or two or more different emulsifiers. The use of two or more different emulsifiers is preferable.

Any known types of emulsifiers are useful in the process of the present invention. These include, for example, anionic, cationic, nonionic and amphoteric emulsifiers, and also protective colloids, and particles that stabilize the emulsions.

Component (B) of the emulsions preferably comprises commercially available emulsifiers, for example sorbitan esters of fatty acids having 10 to 22 carbon atoms; polyoxyethylene sorbitan esters of fatty acids having 10 to 22 carbon atoms and up to 35 percent ethylene oxide content; polyoxyethylene sorbitol esters of fatty acids having 10 to 22 carbon atoms; polyoxyethylene derivatives of phenols having 6 to 20 carbon atoms on the aromatic and up to 95 percent ethylene oxide content; fatty amino- and amidobetaines having 10 to 22 carbon atoms; polyoxyethylene condensates of fatty acids or fatty alcohols Navin 8 to 22 carbon atoms with up to 95 percent ethylene oxide content; ionic emulsifiers, such as alkylaryl sulfonates having 6 to 20 carbon atoms in the alkyl group; fatty acid soaps having 8 to 22 carbon atoms; fatty sulfates having 8 to 22 carbon atoms; alkyl sulfonates having 10 to 22 carbon atoms; alkali metal salts of dialkyl sulfosuccinates; fatty amine oxides having 10 to 22 carbon atoms; fatty imidazolines having 6 to 20 carbon atoms; fatty amidosulfobetaines having 10 to 22 carbon atoms; quaternary emulsifiers, such as fatty ammonium compounds having 10 to 22 carbon atoms; fatty morpholine oxides having 10 to 22 carbon atoms; alkali metal salts of carboxylated, ethoxylated alcohols having 10 to 22 carbon atoms and up to 95 percent ethylene oxide; ethylene oxide condensates of fatty monoesters of glycerol with 10 to 22 carbon atoms and up to 95 percent ethylene oxide; mono- or diethanolamides of fatty acids having 10 to 22 carbon atoms; alkoxylated silicone type emulsifiers having ethylene oxide and or propyleneoxide units; alkyl phosphates and salts thereof.

As is well known in the field of emulsifiers, the counterions in anionic emulsifiers may be alkali metals, ammonia or substituted amines, such as trimethylamine or triethanolamine. Ammonium, sodium and potassium ions are normally preferable. In the case of cationic emulsifiers, the counterion is a halide, sulfate or methosulfate. Chlorides are the compounds mostly available industrially.

Examples of emulsifiers are decylaminobetaine; cocoamidosulfobetaine; oleylamidobetaine; cocoimidazoline; cocosulfoimidazoline; cetylimidazoline; 1-hydroxyethyl-2-heptadecenylimidazoline; n-cocomorpholine oxide; decyldimethylamine oxide; cocoamidodimethylamine oxide; sorbitan tristearate having condensed ethylene oxide groups; sorbitan trioleate having condensed ethylene oxide groups; sodium or potassium dodecylsulfate; sodium or potassium stearylsulfate; sodium or potassium dodecylbenzenesulfonate; sodium or potassium stearylsulfonate; triethanolamine salt of dodecylsulfate; trimethyldodecylammonium chloride; trimethylstearylammonium methosulfate; sodium laurate; sodium or potassium myristate, di-n-butyl phosphate, di-n-hexyl phosphate, mono-n-octyl phosphate, di-n-octyl phosphat, mono-2-ethylhexyl phosphate, di-2-ethylhexyl phosphate, mono-i-nonyl phosphate, di-i-nonyl phosphate, mono-n-decyl phosphate, n-octyl n-decyl phosphate, di-n-decyl phosphate, monoisotridecyl phosphate, di-n-nonylphenyl phosphate, monooleyl phosphate and distearyl phosphate, mono-n-octyl phosphate, di-n-octyl phosphate, mono-n-decyl phosphate, n-octyl n-decyl phosphate, di-n-decyl phosphate, ethoxylated castor oil having 200 ethylene glycol units, ethoxylated castor oil having 40 ethylene glycol units and ethoxylated hydrogenated castor oil having 200 ethylene glycol units, polyoxyethylene(20) sorbitan stearate (polysorbate 60), polyoxyethylene(20) sorbitan tristearate (polysorbate 65), polyoxyethylene(20) sorbitan oleate (polysorbate 80) and polyoxyethylene(20) sorbitan laurate (polysorbate 20), compounds of the formula (IV) i-C$_{13}$H$_{27}$—O—(CH$_2$CH$_2$O)$_{10}$—H, C$_{16}$H$_{33}$—O—(CH$_2$CH$_2$O)$_4$—H, C$_{16}$H$_{33}$—O—(CH$_2$CH$_2$O)$_{20}$—H, C$_{16}$H$_{33}$—O—(CH$_2$CH$_2$O)$_{25}$—H, C$_{18}$H$_{37}$—O—(CH$_2$CH$_2$O)$_4$—H, C$_{18}$H$_{37}$—O—(CH$_2$CH$_2$O)$_{20}$—H, C$_{18}$H$_{37}$—O—(CH$_2$CH$_2$O)$_{25}$—H, C$_{18}$H$_{35}$—O—(CH$_2$CH$_2$O)$_{20}$—H, C$_{12}$H$_{23}$—O—(CH$_2$CH$_2$O)$_4$—H, C$_{12}$H$_{23}$—O—(CH$_2$CH$_2$O)$_{23}$—H, C$_{16}$H$_{33}$—CH$_2$—C(O)—O—(CH$_2$CH$_2$O)$_{20}$—H, C$_{16}$H$_{33}$—CH$_2$—C(O)—O—(CH$_2$CH$_2$O)$_{30}$—H, C$_{16}$H$_{33}$—CH$_2$—C(O)—O—(CH$_2$CH$_2$O)$_{40}$—H and C$_{16}$H$_{33}$—CH$_2$—C(O)—O—(CH$_2$CH$_2$O)$_{100}$—H.

Component (B) may consist of one emulsifier or a mixture of two or more emulsifiers.

In a preferred embodiment, component (B) consists to more than 50 wt %, more preferably to more than 75 wt % of nonionic emulsifiers.

The (B) nonionic emulsifiers present in the emulsion of the present invention preferably have an average HLB value of 10 to 17, preferably 11 to 15.

The HLB value expresses the equilibrium between hydrophilic and hydrophobic groups in an emulsifier. The definition of the HLB value and also its methods of determination are known to the notional person skilled in the art and have been described, for example in the Journal of Colloid and Interface Science 298 (2006) 441-450 and also the literature cited therein, especially reference [23].

Useful emulsifying protective colloids include, for example, polyvinyl alcohols and also cellulose ethers, such as methylcellulose, hydroxyethylcellulose or carboxymethylcellulose.

Useful particles for stabilization of emulsions include, for example, partly hydrophobicized colloidal silicas.

All further chemistries (D) typically added to silicone emulsions are useful in addition to components (A), (B) and (C). Examples of further components (D) include further siloxanes other than component (A), e.g., polyether siloxanes; silanes especially alkoxysilanes; thickeners; protective colloids; fillers; additives, for example preservatives, disinfectants, wetters, corrosion inhibitors, dyes and fragrances, and mixtures thereof.

If used, further siloxanes other than component (A) are preferably used in amounts of 0.1 to 1 part by weight, based on 100 parts by weight of component (A).

If used, silanes are preferably used in amounts of 0.1 to 50 parts by weight, based on 100 parts by weight of component (A).

Examples of fillers include colloidal silicas, which are preferably mixed with the polyorganosiloxane (A) before the execution of the process according to the present invention. These silicas are preferably hydrophobic, for which they may have been pretreated or hydrophobicized in situ in the polyorganosiloxane. A mixture of various fillers may also be used. Such mixtures of polyorganosiloxanes are known for example as defoamer compositions (e.g., U.S. Pat. No. 8,530,401 B2). If used, fillers are preferably used in amounts of 0.1 to 20 parts by weight, based on 100 parts by weight of component (A).

Where the process of the present invention utilizes thickeners and/or protective colloids as component (D) in addition to emulsifier (B), it is preferably acrylic acid copolymers, cellulose ethers and polysaccharides, such as xanthan gum for example, which are concerned.

If used, thickeners and/or protective colloids (D) are preferably used in amounts of 0.01 to 2 parts by weight, based on 100 parts by weight of component (A).

Examples of additives (D) useful for the purposes of the present invention include, for example, conventional preservatives, dye or fragrance chemistries, especially preservatives, such as methylisothiazolinone, chloromethylisothiazolinone, benzylisothiazolinone, phenoxyethanol, methylparaben, ethylparaben, propylparaben, butylparaben, isobutylparaben, alkali metal benzoates, alkali metal sorbates, iodopropynyl butylcarbamate, benzyl alcohol and 2-bromo-2-nitropropane-1,3-diol.

If additives (D) are used, the amounts are preferably 0.0005 to 2 parts by weight, based on 100 parts by weight of component (A). The process of the present invention preferably does utilize additives (D), especially preservatives.

The process of the present invention enables the production of emulsions across a wide range of particle sizes, for example a range from 5 nm up to 500 μm D(50) based on the D(50) value of the volume distribution.

One version of the process has target particle sizes (central value of the volume distribution) above 1 μm, especially particle sizes of 5 to 50 μm, these particulars relating to the D(50) value of the volume distribution as measured according to the principle of Fraunhofer diffraction (corresponding to ISO 13320). The parameter for the measurement is assumed to be a spherical model having a refractive index of 1.33 for the continuous phase and of 1.39 for the disperse phase and an absorption of 0.01.

The emulsions obtained according to the present invention preferably have a nonvolatiles content of 1 to 80 wt %, more of 30 to 70 wt %, as measured according to DIN EN ISO 3251.

The pH of the emulsions obtained according to the present invention is preferably in the range from 3 to 10, more preferably 3 to 8.

The water (C) may be any of the types of water hitherto also used for production of dispersions. Water (C) is preferably partially or completely ion-free water, distilled or (repeatedly) redistilled water, water for medical or pharmaceutical purposes, for example purified water (Aqua purificata as per Pharm. Eur.). Water (C) as used for the purposes of the present invention preferably has a conductivity of less than 50 μS/cm, more preferably less than 10 μS/cm, and especially less than 1.3 μS/cm, all at 25° C. and 1010 hPa.

Water (C) is preferably employed in amounts of 10 to 1000 parts by weight, more preferably 40 to 500 parts by weight, based on 100 parts by weight of component (A).

The process of the present invention is preferably carried out at temperatures of 0 to 80° C., more preferably 5 to 60° C., especially 10 to 50° C.

The components employed in the process of the present invention may each comprise a mixture of at least two species of such a component as well as one species of the particular component.

The process of the present invention has the advantage that product properties, such as particle size, are particularly simple to control, while the central particle size D(50) is preferably controlled via the mixing intensity and/or more preferably by dividing up the proportions of components (A) to (D), preferably (B) and (C), especially (C), which are imported at the further feedpoints between the mixing elements along the mixer.

A particular advantage of the process according to the present invention is that emulsions are obtainable with central particle sizes above 1 μm (D(50) value of the volume distribution.

The process of the present invention has the advantage of producing but minimal pressure drops and hence of being particularly energy efficient.

The process of the present invention has the advantage of utility for a broad spectrum of products, e.g., across polyorganosiloxane species and viscosity.

The emulsions obtained according to the present invention have the advantage of being very stable and hence persistently durable.

The emulsions obtained according to the present invention have the advantage of being storage-stable and having outstanding performance characteristics, for example a very good effect as release and slip agent, good wetting ability on different substrates, good conditioning effect in hair care products, i.e., distinctly reducing the wet and dry combing force.

The process of the present invention has the advantage of providing high space-time yields and thus a simple and inexpensive way to produce emulsions comprising siloxanes.

The emulsions obtained according to the present invention are useful for all purposes for which emulsions comprising polyorganosiloxanes have hitherto also been used to date, e.g., as release agents, slip agents, hydrophobicizing agents and for textile impregnation, in the processing of rubber and plastics or in metal processing, hydrophobicizing agents for glass and mineral building materials or as a constituent of personal care products.

Parts and percentages in the examples which follow are by weight, unless otherwise stated. The examples which follow are carried out, unless otherwise stated, at a pressure of the ambient atmosphere, i.e., at about 1010 hPa, and at room temperature, i.e., about 25° C. and/or a temperature which is the autogenous result of adding together the reactants at room temperature without additional heating or cooling. Viscosities reported in the examples are all based on a temperature of 25° C.

The emulsions obtained in the examples which follow were tested as follows:

The particle size in the range up to 1000 nm was determined using a ZEN1600/Nano-S Zetasizer particle size analyzer from Malvern, Software Version 6.01 by dynamic light scattering. To this end, the emulsions were diluted to 0.5% with filtered and devolatilized water. The values reported all relate to the D(50) value.

D(50) is the central value of the volume distribution, as described in Basic Principles of Particle Size Analysis, Technical Paper, by Dr. Alan Rawle, Malvern Instruments Limited 2000.

With the coarsely divided emulsions having particle sizes above 1 μm, the particle size measurement was carried out with a Malvern Mastersizer 2000 (Malvern Instruments GmbH D-Herrenberg; measurement principle: Fraunhofer diffraction corresponding to ISO 13320). The parameter for the measurement is assumed to be a spherical model having a refractive index of 1.33 for the continuous phase and of 1.39 for the disperse phase and an absorption of 0.01.

The viscosities of the emulsions were measured with a "Brookfield programable Viskosimeter DV-II+" with spindle 3 at 20° C. and 20 revolutions/min, the value being read off after 20 s.

The pH was measured in accordance with US Pharmacopeia USP 33 at 20° C.

Examples 1 to 13

The mixer configuration used was as follows (see FIG. 1): 6 mixing element pairs between feedpoints X2 and X3 and 5 mixing element pairs between feedpoint X3 and the product outlet. A mixing element pair in these examples corresponds to one rotor and one stator at a time. The axial gap size $s_{ax.}$ between every rotor and stator element was 5 mm in each case. The radial gap size $s_{rad.}$ was 2 mm. The rotors consisted of star type arrangements of teeth on the shaft. 8 teeth at a time were axially positioned on the shaft to form one rotor element. The stators were each formed by 8 inwardly directed teeth placed at the same axial position.

18 kg/h (Example 5 9 kg/h) of a polydimethylsiloxane having a viscosity of 60,000 mPas are pumped into the mixer at feedpoint X1. An aqueous mixture of two different ethoxylated lauryl alcohols of the formulae $C_{12}H_{23}$—O—$(CH_2CH_2O)_{23}$—H (available as "BRIJ® L23" from Croda GmbH, D-Nettetal, HLB value 16.9) and $C_{12}H_{23}$—O—$(CH_2CH_2O)_4$—H (available as "BRIJ® L4" from Croda GmbH, D-Nettetal, HLB value 10.1) in a ratio of 1:5 (average HLB value 11.2) and phenoxyethanol is added at feedpoint X2. The amount of water in the mixture was varied. However, the rate of metering was adjusted such that 0.3 kg/h (Example 5 0.15 kg/h) of BRIJ® L23, 1.5 kg/h (Example 5 0.75 kg/h) BRIJ® L4 and 0.27 kg/h (Example 5 0.135 kg/h) of phenoxyethanol were added at feedpoint X2 in all runs. Further water was added at feedpoint X3.

The water split between the feedpoints X2 and X3 and the particle sizes obtained are reported below in Tables 1 to 3.

TABLE 1

Particle sizes of Examples 1 to 5 as a function of varied water feed split at constant rotor speed

| Example | 1 | 2 | 3 | 4 | 5 |
|---|---|---|---|---|---|
| water fed at X2 in kg/h | 10 | 5 | 3.5 | 2 | 2.5[1)] |
| water fed at X3 in kg/h | 0 | 5 | 6.5 | 8 | 2.5[1)] |
| rotor speed in rpm | 600 | 600 | 600 | 600 | 600 |
| D(50) in μm | 11.80 | 8.96 | 3.19 | 1.43 | 9.80 |

[1)]Example 5: half the total throughput of Example 2

TABLE 2

Particle sizes of Examples 6 to 9 as a function of rotor speed at consistent water feed at one feedplace

| Example | 6 | 7 | 1 | 8 | 9 |
|---|---|---|---|---|---|
| water fed at X2 in kg/h | 10 | 10 | 10 | 10 | 10 |
| water fed at X3 in kg/h | 0 | 0 | 0 | 0 | 0 |
| rotor speed in rpm | 150 | 300 | 600 | 1200 | 1800 |
| D(50) in μm | 36.48 | 31.40 | 11.80 | 4.04 | 3.39 |

TABLE 3

Particle sizes of Examples 10 to 13 as a function of rotor speed at constant split of water feed at two feedplaces

| Example | 10 | 11 | 2 | 12 | 13 |
|---|---|---|---|---|---|
| water fed at X2 in kg/h | 5 | 5 | 5 | 5 | 5 |
| water fed at X3 in kg/h | 5 | 5 | 5 | 5 | 5 |
| rotor speed in rpm | 150 | 300 | 600 | 1200 | 1800 |
| D(50) in μm | 18.08 | 10.75 | 8.96 | 3.84 | 3.68 |

It is clear that the process of the present invention, i.e., variation of the rotor speed combined with the variation of the water feed split between feedpoints X2 and X3 provides very good control over the particle size across a wide range.

COMPARATIVE EXAMPLES

These examples were used to test other homogenizing/mixing principles in order to compare whether it is at all sensible to use these in a continuous process.

Comparative Example V1 (Formulation Corresponds to Examples 1-4)

150 g of water, 10 g of an ethoxylated lauryl alcohol of the formula $C_{12}H_{23}$—O—$(CH_2CH_2O)_{23}$—H (obtainable as "BRIJ® L23" from Croda GmbH, D-Nettetal, HLB value 16), and 40 g of an ethoxylated lauryl alcohol of the formula $C_{12}H_{23}$—O—$(CH_2CH_2O)_4$—H (obtainable as "BRIJ® L4" from Croda GmbH, D-Nettetal, HLB value 10.1) and 5 g of phenoxyethanol were mixed with a propeller stirrer. Following admixture of 600 g of a polydimethylsiloxane having a viscosity of 60,000 mPas, the mixture was stirred for a further 10 min. The emulsion was then thinned with 195 g of water and subsequently homogenized with an APV 2000 laboratory high pressure homogenizer (APV Homogenisers, Rannie&Gaulin, Roholmsvej 8, DK-2620 Albertslund) at 500 bar.

Comparative Example V2 (Formulation Corresponds to Examples 1-4)

30 g of water, 10 g of an ethoxylated lauryl alcohol of the formula $C_{12}H_{23}$—O—$(CH_2CH_2O)_{23}$—H (obtainable as "BRIJ® L23" from Croda GmbH, D-Nettetal, HLB value 16.9), and 40 g of an ethoxylated lauryl alcohol of the formula $C_{12}H_{23}$—O—$(CH_2CH_2O)_4$—H (obtainable as "BRIJ® L4" from Croda GmbH, D-Nettetal, HLB value 10.1) and 5 g of phenoxyethanol were mixed with a T50 Ultra-Turrax (i.e., a toothed cog disperser having its own pumping effect and radial flow therethrough) at 4000/min. The mixture of 600 g of polydimethylsiloxane having a viscosity of 60,000 mPas was followed by a further 5 min of homogenization. The emulsion was then thinned with 230 g of water.

Comparative Example V3 (Formulation Corresponds to Examples 1-4; a Run Attempting to Increase the Particle Size Via the Addition of Water)

300 g of water, 10 g of an ethoxylated lauryl alcohol of the formula $C_{12}H_{23}$—O—$(CH_2CH_2O)_{23}$—H (obtainable as "BRIJ® L23" from Croda GmbH, D-Nettetal, HLB value 16.9), and 40 g of an ethoxylated lauryl alcohol of the formula $C_{12}H_{23}$—O—$(CH_2CH_2O)_4$—H (obtainable as "BRIJ® L4" from Croda GmbH, D-Nettetal, HLB value 10.1) and 5 g of phenoxyethanol were mixed with a T50 Ultra-Turrax (i.e., a toothed cog disperser having its own pumping effect and radial flow therethrough) at 4000/min. The mixture of 600 g of polydimethylsiloxane having a viscosity of 60 000 mPas was followed by a further 5 min of homogenization. The emulsion was then thinned with 45 g of water.

The emulsion quickly exhibited distinct signs of oil segregation on briefly standing and was unusable.

The particle sizes and centrifugation stabilities (not determined for Comparative Example V3, already displaying visible signs of oil segregation) of Comparative Examples V1 and V2 and of Examples 1 to 5 are set out in the table below.

The emulsions of Examples 1 to 5 and also Comparative Examples V1 and V2 were centrifuged at 4000/min (corresponding to about 2300×g) for 8 h using a LUMiFuge® 110.2-69 (LUM GmbH Berlin) and cuvettes having path lengths of 2 mm. Stability is characterized in terms of the instability index put out by the software of the instrument. When the instability index is 0, the emulsion is stable; if it is 1, the emulsion is fully separated (cf. Dispersion Letters Technical, T4 (2013) 1-4, Update 2014).

TABLE 4

Particle sizes, emulsion viscosities and stabilities of the emulsions of Examples 1 to 3 and also of Comparative Examples V1 to V3

| Example | 1 | 2 | 3 | V1 | V2 | V3 |
|---|---|---|---|---|---|---|
| D(50) in µm | 11.80 | 8.96 | 3.19 | 10.12 | 0.51 | 9.31 |
| viscosity in mPas | 550 | 790 | 1700 | 60 | 2560 | — |
| instability index | 0.194 | 0.105 | 0.027 | 0.462 | 0.04 | — |

The high pressure homogenizer in Comparative Example 1 provides an emulsion having a distinctly lower viscosity and hence poorer centrifugation stability. This is because the severe shearing load and stretching flow in the high pressure homogenizer destroys the viscosity increasing physical interactions of the emulsifiers.

The toothed cog disperser (Comparative Examples V2 and V3) only gave stable emulsions if a particle size of less than 1 µm (as also described in US 2007/0203263 A1) is reached. The attempt to produce larger particles similarly to the process of the present invention by varying the water added was only marginally successful, since the emulsion was non-useable owing to oil segregation.

Given that the addressed problem is that of providing a process capable of achieving a wide range of particle sizes, these results disqualify high pressure homogenizers or toothed cog dispersers, i.e., rotor-stator mixers having radial flow therethrough, from any continuous form of emulsion production.

Examples 14 to 18

The process of Examples 1 to 13 was repeated except that the mixer configuration was varied.

TABLE 5

Particle sizes of Examples 14 to 18 as a function of mixer configuration and rotor speed with the water added being equally split between two feedplaces

| Example | 14 | 15 | 16 | 17 | 18 |
|---|---|---|---|---|---|
| mixing elements upstream of feed X3 | 3 | 3 | 9 | 4 | 4 |
| mixing elements downstream of feed X3 | 8 | 8 | 2 | 2 | 2 |
| water fed at X2 in kg/h | 5 | 5 | 5 | 5 | 5 |
| water fed at X3 in kg/h | 5 | 5 | 5 | 5 | 5 |
| rotor speed in rpm | 300 | 600 | 600 | 600 | 1200 |
| D(50) in µm | 12.02 | 5.02 | 9.52 | 10.50 | 3.47 |

Varying the mixer configuration likewise enables conforming the process of the present invention to the requirements, such as desired particle size.

Examples 19 to 23

(Mixer Configuration as with Examples 1-13)

21 kg/h of a polydimethylsiloxane having a viscosity of 330,000 mPas are pumped into the mixer at feedpoint X1. An aqueous mixture of ethoxylated isotridecyl alcohol of the formula $C_{13}H_{27}$—O—$(CH_2CH_2O)_5$—H having an HLB value of 11.2 (obtainable as "LUTENSOL® T05" from BASF SE Ludwigshafen) and an ethoxylated castor oil having on average 200 ethylene glycol units and an HLB value of 18.1 (obtainable as "ETOCAS® 200" from Croda GmbH, D-Nettetal) in ratio of 1:1 and phenoxyethanol is added at feedpoint X2. The water quantity in the mixture was varied. However, the rate of metering was adjusted such that 0.75 kg/h of LUTENSOL® T05, 0.75 kg/h of ETOCAS® 200 and 0.27 kg/h of phenoxyethanol were added in all runs at feedplace X2. Further water was added at feedpoint X3.

The water split between the feedpoints X2 and X3 and the particle sizes obtained are reported below in the tables.

TABLE 6

Particle sizes of Examples 19 to 23 as a function of rotor speed at constant split of water feed at two feedplaces

| Example | 19 | 20 | 21 | 22 | 23 |
|---|---|---|---|---|---|
| water fed at X2 in kg/h | 6 | 6 | 2.4 | 1.2 | 1.2 |
| water fed at X3 in kg/h | 0 | 0 | 3.6 | 4.8 | 4.8 |
| rotor speed in rpm | 600 | 1800 | 600 | 300 | 600 |
| D(50) in μm | 13.49 | 8.61 | 3.21 | 2.58 | 2.23 |

Example 24: Producing an Emulsion by Emulsion Polymerization (Mixer Configuration as with Examples 1-13)

15 kg/h of an α,ω-hydroxy-terminated polydimethylsiloxane having a viscosity of 50,000 mPas are introduced into the mixer at feedpoint X1. The rotors turn at 500 revolutions/min. A 40% aqueous solution of an ethoxylated lauryl alcohol of the formula $C_{12}H_{23}$—O— $(CH_2CH_2O)_{23}$— H (obtainable as "Brij 35" from Croda GmbH, D-Nettetal, HLB value 16.9) is added at feedplace X2 at the rate of 5.1 kg/h.

A 13% aqueous solution of an octyl decyl phosphate having an acid number of 295 mg KOH/g (obtainable as "Crodafos 810 A" from Croda GmbH, D-Nettetal) is added at feedplace X3 at a rate of 7 kg/h. The emulsion (pH 1.6) pumped out of the mixer and into a tank was collected for a period of 10 h and then stored at 5° C. for a further 48 h and subsequently adjusted to pH 7 with triethanolamine and admixed with 0.09% of preservative based on methylisothiazolinone combined with ethylhexylglycerol (obtainable as "Euxyl K220" from Schülke&Mayr GmbH Norderstedt).

The emulsion had a particle size of 18 μm.

To determine the oil viscosity, 20 g of emulsion were admixed with 30 g of acetone, causing the emulsion to separate. The acetone-water phase was separated off and the operation was repeated once more. Subsequently, the polymer was three times washed with water and dried at 110° C. with stirring until water droplets ceased to be visible and subsequently aftertreated in a drying cabinet at 110° C. for 8 h. The viscosity was determined to DIN 53019 using an MCR 300 cone-plate viscometer (Paar-Physika) at 25° C. and a shear gradient of 1/s. The oil viscosity was 1,820,000 mPas.

Example 25: Producing a Microemulsion (Mixer Configuration as with Examples 1-13)

9 kg/h of a polydimethylsiloxane having aminoethylaminopropyl groups and a viscosity of 1200 mPas and an amine number of 0.6 meq/g are introduced into the mixer at feedpoint X1. The rotors turn at 500 revolutions/min. A mixture of 10 parts of ethoxylated isotridecyl alcohol of formula $C_{13}H_{25}$—O— $(CH_2CH_2O)_8$—H (obtainable as "Lutensol TO 8" from BASF SE, HLB value 12.8), 5 parts of butyl diglycol, 0.6 part of glacial acetic acid and 10 parts of water are added at feedpoint X2 at a rate of 10.5 kg/h.

10.5 kg/h of water are added at feedplace X3.

The microemulsion obtained was clear and had a D(50) particle size of 9.8 nm.

Example 26: Producing an Emulsion Having a Small Particle Size (Mixer Configuration as with Examples 1-13)

15 kg/h of a polydimethylsiloxane having a viscosity of 60,000 mPas are introduced into the mixer at feedpoint X1. The rotors turn at 1200 revolutions/min. A 63% aqueous solution of an alkylpolyglucoside having an average alkyl chain length of 8.8 and a glucositation degree of 1.7 (available as "GLUCOPON® 215 UP" from BASF SE Ludwigshafen) is added at feedpoint X2 at a rate of 2 kg/h. 13 kg/h of water containing 2% of phenoxyethanol are added at feedpoint X3. The final emulsion had a D(50) particle size of 0.266 μm.

What is claimed is:

1. A continuous process for production of emulsions which comprise polyorganosiloxanes (A), emulsifiers (B), water (C) and optionally further components (D), wherein the process comprises:
    continuously feeding components (A) through (D) into a cylindrical mixer comprising two or more rotor-stator mixing elements providing axial flow therethrough, wherein the rotor and stator elements are each arranged with an axial offset, and the cylindrical mixer contains at least one feedpoint upstream from the mixing elements of the cylindrical mixer and at least one further feedpoint along the mixer between mixing elements,
    supplying the polyorganosiloxanes (A) via a feedpoint at the entry to the mixer, optionally in the form of a premix with a portion of one or more of emulsifiers (B), water (C), further components (D) and mixtures thereof, and supplying emulsifiers (B) and water (C), optionally portions of polyorganosiloxanes (A), and optionally further components (D), separately or as a premix at one or more feedpoints upstream from the mixing elements and/or at one or more feedpoints between the mixing elements, wherein the admixture of the total amounts of components (A) to (D) is in each case effected independently of one another via one feedpoint or across two or more feedpoints,
    where the central particle size D(50) of the emulsions is greater than 1 μm, and
    controlling the central particle size D(50) of the emulsions by splitting the proportions of components (A) to (D), which are imported at the further feedpoints between the mixing elements along the mixer, and continuously withdrawing a product emulsion from the cylindrical mixer,
    where the central particle size relates to the D(50) value of the volume distribution as measured by the principle of Fraunhofer diffraction corresponding to ISO 13320 and the parameters for measurement assume a spherical model having a refractive index of 1.33 for the continuous phase, of 1.39 for the disperse phase, and an absorption of 0.01.

2. The continuous process of claim 1, wherein the central particle size D (50) is controlled by importing one or more components (B) and (C) at the further feed points.

3. The continuous process of claim 1, wherein the central particle size D (50) is controlled by importing one or more components (C) at the further feed points.

4. The continuous process of claim 1, wherein the polyorganosiloxanes (A) are fed at the point of entry to the mixer and the admixture of the total amount of emulsifiers (B) and water (C) is effected, independently of each other, separately or as a premix, at a feedpoint upstream of the mixing elements of the mixer or divided across a feedpoint upstream and further feedpoints between the mixing elements of the mixer.

5. The continuous process of claim 1, wherein the polyorganosiloxanes (A) are supplied at the point of entry to the mixer, emulsifiers (B) are admixed at a feedpoint upstream of the mixing elements and the admixture of the total amount of water is effected at a feedpoint upstream of the mixing elements or divided across the further feedpoints between the mixing elements.

6. The continuous process of claim 1, wherein emulsifiers (B) and water (C) are admixed as a premix at a feedpoint upstream of the mixing elements.

7. The continuous process of claim 6, wherein further water (C) is mixed at one or more further feedpoints between the mixing elements.

8. The continuous process of claim 1, wherein the mixer contains 3 to 60 rotor-stator mixing elements.

9. The continuous process of claim 1, wherein the mixer contains 5 to 40 rotor-stator mixing elements.

10. The continuous process of claim 1, wherein the mixer has 1 to 10 further feedpoints along the mixer between the mixing elements.

11. The continuous process of claim 1, wherein the mixer has 1 to 5 further feedpoints along the mixer between the mixing elements.

12. The continuous process of claim 1, wherein 2 to 10 mixing elements, are situated between the feedpoints and also between the last feedpoint in the mixer and the point of outlet from the mixer.

13. The continuous process of claim 1, wherein 2 to 5 mixing elements, are situated between the feedpoints and also between the last feedpoint in the mixer and the point of outlet from the mixer.

14. The continuous process of claim 1, wherein at the mixing elements, the axial gap between rotor and stator is 0.1 to 15 mm, and the radial gap between the rotor of the mixing elements and the housing of the mixer is 0.1 to 10 mm.

15. The continuous process of claim 1, wherein at the mixing elements, the axial gap between rotor and stator is 1 to 5 mm, and the radial gap between the rotor of the mixing elements and the housing of the mixer is 0.5 to 5 mm.

16. The continuous process of claim 1, wherein the rotational speed of the rotors in the mixer is 10 to 50,000 revolutions/min, and the circumferential speed of the outside surface of the rotors is 0.1 to 30 m/s.

17. The continuous process of claim 1, wherein the rotational speed of the rotors in the mixer is 50 to 3,000 revolutions/min, and the circumferential speed of the outside surface of the rotors is 0.5 to 15 m/s.

18. The continuous process of claim 1, wherein the emulsions obtained contain high viscosity polyorganosiloxanes having a viscosity of 10,000 to 2,000,000 mPa·s at 25° C., as measured according to DIN ISO 53019.

19. The continuous process of claim 1, wherein the emulsions obtained have central particle sizes D(50) of 5 to 50 μm.

20. The continuous process of claim 1, wherein two or more mixers are connected in series, at least one of the one or more mixers connected in series being a cylindrical mixer.

21. The continuous process of claim 1, wherein the (A) polyorganosiloxanes are produced in a continuous manner beforehand and then in their as-obtained state are used directly for producing the emulsions.

* * * * *